Figures 1, 2:
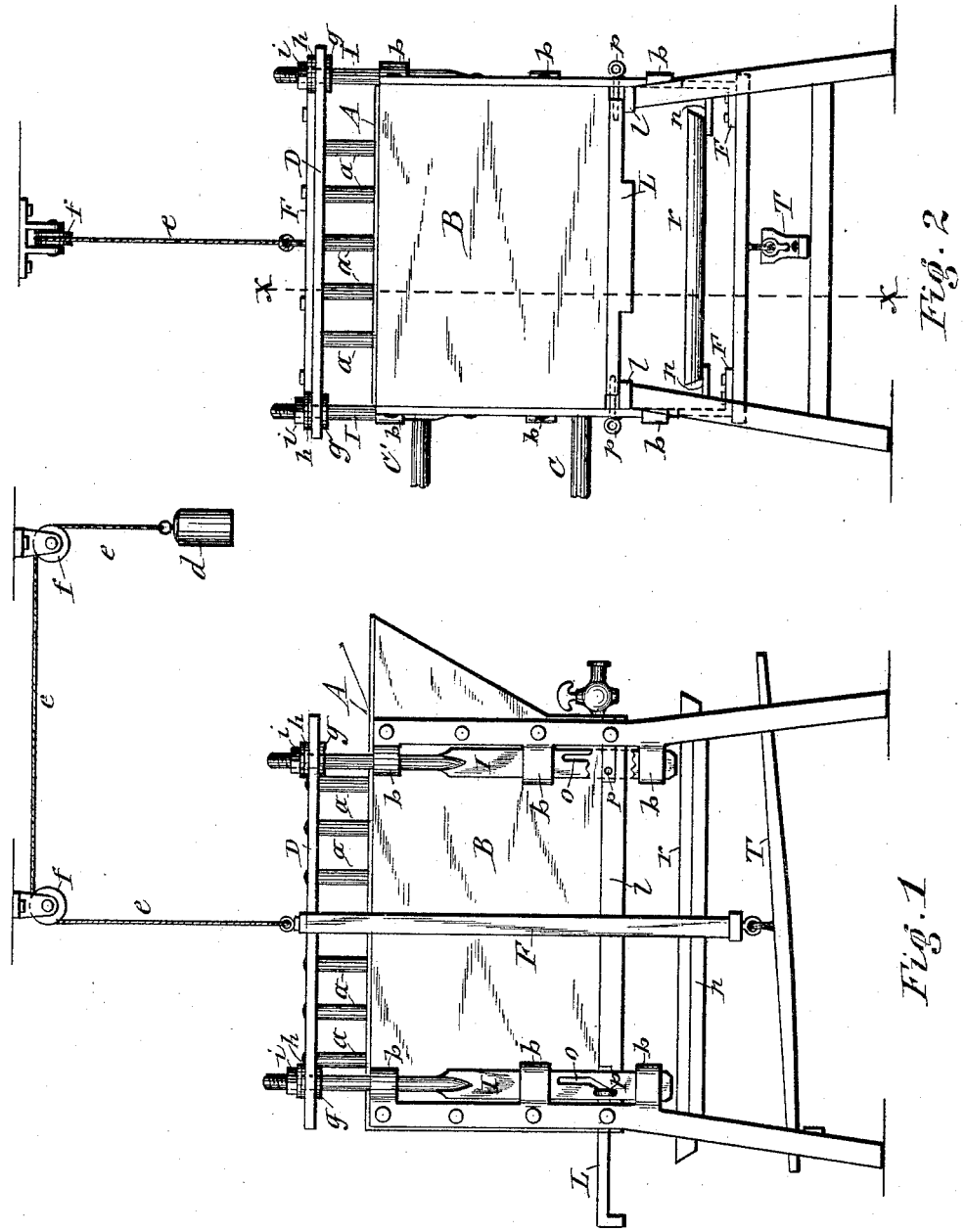

(No Model.) 2 Sheets—Sheet 1.

M. M. JUNE.
MACHINE FOR MANUFACTURING CONFECTIONERY DROPS.

No. 458,809. Patented Sept. 1, 1891.

WITNESSES:
C. L. Bendixon
J. J. Laass

INVENTOR:
Marcus M. June
BY
Duell, Laass & Duell
his ATTORNEYS.

THE NORRIS PETERS CO., PHOTO-LITHO., WASHINGTON, D. C.

(No Model.) 2 Sheets—Sheet 2.
M. M. JUNE.
MACHINE FOR MANUFACTURING CONFECTIONERY DROPS.
No. 458,809. Patented Sept. 1, 1891.
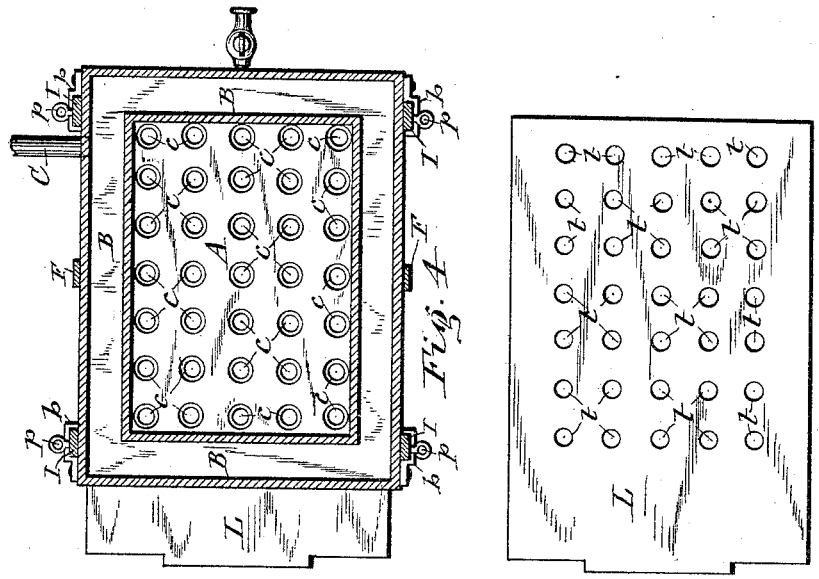
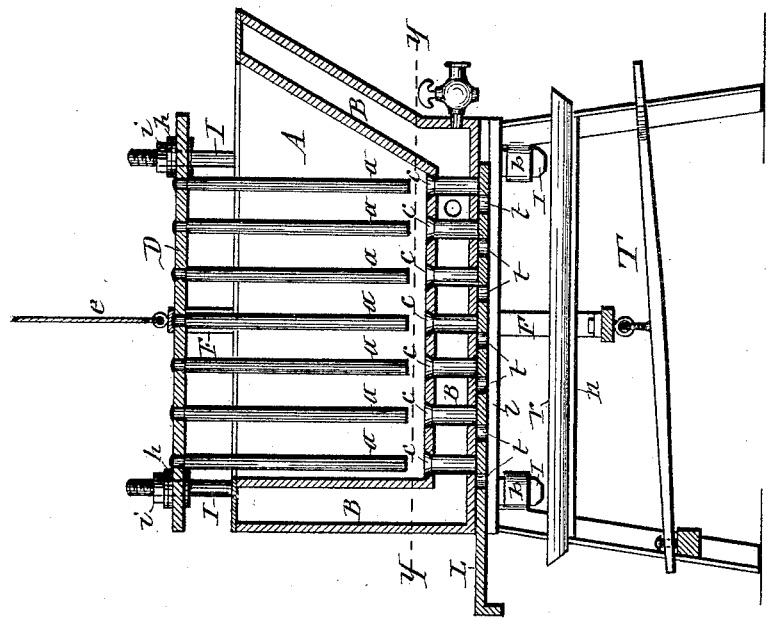
WITNESSES:
C. L. Bendixon
J. J. Laass
INVENTOR:
Marcus M. June
BY
Duell, Laass & Duell
his ATTORNEYS

UNITED STATES PATENT OFFICE.

MARCUS M. JUNE, OF SYRACUSE, NEW YORK, ASSIGNOR OF TWO-THIRDS TO ORSON COVILLE AND TRUMAN H. WHITCOMB, OF SAME PLACE.

MACHINE FOR MANUFACTURING CONFECTIONERY-DROPS.

SPECIFICATION forming part of Letters Patent No. 458,809, dated September 1, 1891.

Application filed May 26, 1890. Serial No. 353,133. (No model.)

*To all whom it may concern:*

Be it known that I, MARCUS M. JUNE, of Syracuse, in the county of Onondaga, in the State of New York, have invented new and useful Improvements in Machines for Manufacturing Confectionery-Drops, of which the following, taken in connection with the accompanying drawings, is a full, clear, and exact description.

This invention relates to the class of confectionery-dropping machines in which a steam-jacketed confection pan or receptacle is provided with discharge-ports in its bottom and a corresponding number of plungers are adapted to enter said ports from the interior of the receptacle and force through said ports the requisite portions of the confectionery rendered semi-fluid by heat in the receptacle.

The object of my present invention is to provide a machine which shall have the interior of the pan or receptacle devoid of obstructions other than the plungers, and have the guides for the plungers and the reciprocating rods which operate the plungers all disposed on the exterior of the receptacle, and thus relieved from liability of becoming clogged by the confectionery coming in contact therewith.

A further object of the invention is to locate the gate or cut-off in such a position as to obviate the liability of its becoming clogged and to allow the same to be easily accessible for cleaning it.

To these ends the invention consists in the improved construction and combination of the constituents of the machine, as hereinafter fully described, and set forth in the claims.

In the annexed drawings, Figure 1 is a side elevation of a machine embodying my invention. Fig. 2 is an end view of the same. Fig. 3 is a vertical longitudinal section on line $x\,x$, Fig. 2. Fig. 4 is a horizontal transverse section on line $y\,y$, Fig. 3; and Fig. 5 is a detached plan view of the gate which opens and closes the discharge-ports of the receptacle containing the confection material.

Similar letters of reference indicate corresponding parts.

A represents the receptacle for the material from which the confectionery-drops are to be manufactured. Said receptacle consists of a metal pan or tank, which may be either rectangular, as shown, or of any other suitable shape, and has connected to it a suitable heater to heat the confection material contained in said receptacle. This heater I preferably form by surrounding the sides, ends, and bottom of the receptacle A by a jacket or chamber B, having connected to it pipes C C', by which to introduce and circulate through said jacket or chamber either steam or hot water or other suitable heating agent. The source of said heating agent may be either a steam generator or boiler or any other suitable and well-known heating apparatus, not necessary to be here shown.

The bottom of the receptacle A is provided with a series of discharge-ports $c\,c\,c$, of the form of cylindrical tubes extending from the interior of the receptacle through the heater B, as shown in Fig. 3 of the drawings. A corresponding series of plungers $a\,a\,a$ is rigidly secured to a horizontal plate D above the ports $c\,c\,c$, and preferably above the top of the receptacle A, and made to project over the outer edges of said receptacle. Said plungers are disposed in the same relative positions as the ports $c\,c\,c$, so as to allow the lower ends of the plungers to enter said ports from the interior of the receptacle A. The plate D is movable vertically and guided by vertical bars or rods I I I I, which are connected at their upper ends to the projecting edges of said plate and extend through vertical guides $b\,b\,b$, secured to the exterior of the receptacle or its heating-jacket B. The plate D being horizontal and the plungers $a\,a\,a$ of equal lengths, causes all of said plungers to enter the ports $c\,c\,c$ simultaneously and to uniform depths during the downward movement of the plate D. Said movement is preferably effected by means of a treadle T, hinged to the supporting-frame of the apparatus beneath the receptacle A, to which treadle are connected the lower ends of metallic straps F F, the upper ends of which are attached to the plate D, preferably at the center of the length thereof.

To lift the plate D and withdraw the plungers $a\,a\,a$ from the ports $c\,c\,c$, I preferably employ a weight $d$, connected with the center of the plate D by a cord or chain $e$, passing over pulleys $f f$, as shown in Figs. 1 and 2 of the drawings.

In order to allow the thrusts of the plungers $a\ a\ a$ to be regulated to enter the ports $c\ c\ c$ to a greater or less depth, as may be required, I connect the rods I I I I adjustably vertically to the plate D by providing the latter with apertures through which the upper ends of the rods pass freely, and providing said rods with collars $g\ g$ under the plate, and with screw-threads on the protruding ends of the rods and applying thereto washers $h\ h$ and nuts $i\ i$. By shifting the washers from the top of the plate to the under side thereof, or vice versa, the plungers are allowed to enter the ports $c\ c\ c$ to a less or a greater depth, as may be desired.

L represents a gate, preferably of the form of a horizontal plate, sliding across the bottoms of the ports $c\ c\ c$ and guided in ways $l\ l$ on opposite sides of the under side of the jacket or heater B, said plate being provided with ports $t\ t\ t$, coinciding with the ports $c\ c\ c$ in size and relative positions, so that by sliding the plate in one direction the ports $t\ t\ t$ will register with the ports $c\ c\ c$. The movement of this gate I render automatic by providing the lower ends of the rods I I I I with diagonal slots $o\ o\ o\ o$ and securing to the gate laterally-projecting pins $p\ p$, which extend through said diagonal slots, as illustrated in Fig. 2 of the drawings. Said connection of the gate with the vertically-moving rods causes the gate to be reciprocated simultaneously with the reciprocating movement of the rods.

I do not wish to be limited specifically to the form of the gate herein shown and described, as the same is susceptible of many modifications, the essential feature being the arrangement of the gate underneath the receptacle, where it is nearly or quite free from liability of becoming clogged by the confectionery, and where it is also readily accessible for cleaning it.

Beneath the gate L are horizontal parallel ways $n\ n$, secured to the inner sides of the supporting-frame of the machine. Upon these ways is placed the pan $r$ to receive the confection-drops issuing from the ports $c$ and $t$.

The described machine is operated as follows, to wit: When in its normal position, the plate D, with the plungers $a\ a\ a$, is raised and the gate L moved to close the ports $c\ c\ c$, as illustrated in Fig. 3 of the drawings. The jacket B being heated and the confection material introduced into the receptacle A and the pan $r$ placed upon the ways $n\ n$, the operator depresses the treadle T, and thereby forces the plungers $a\ a\ a$ into the ports $c\ c\ c$, and during the latter part of said movement of the plungers the gate L is moved so as to cause its ports $t\ t\ t$ to register with the ports $c\ c\ c$, and thus the contents of the latter ports are allowed to drop upon the underlying pan $r$, upon which the drops are collected and subsequently dried, baked, or cured, as the nature of the material may require. The operator then releasing the treadle allows the weight $d$ to draw up the plate D with the plungers, and the gate L is simultaneously pushed into position to close the ports $c\ c\ c$. The pan $r$ being then removed and an empty pan placed on the ways $n\ n$, the machine is ready for another operation of depositing on the pan $r$ drops of the confection material from the receptacle A.

Having described my invention, what I claim as new, and desire to secure by Letters Patent, is—

1. The combination, with the confection-receptacle provided with a series of discharge-ports in its bottom, of vertical guides on said receptacle, rods sliding in said guides and screw-threaded on their upper ends and provided with collars below the screw-threaded portions, a plate having perforations receiving through them the screw-threaded ends of the aforesaid rods, coupling-nuts and adjusting-washers on said ends of the rods, and a series of plungers secured to the said plate and entering the ports of the receptacle, as set forth.

2. The combination, with the confection-receptacle provided with a series of discharge-ports in its bottom, of a gate arranged movably across the ports to open and close the same, a horizontal plate arranged to move vertically above the ports, a series of plungers attached to said plate and entering the aforesaid ports, and rods connected to the said plunger-carrying plate and to the gate to operate the latter automatically with the movements of the plungers, substantially as set forth.

3. In combination with the confection-receptacle provided with a series of discharge-ports in its bottom and a gate sliding across the bottoms of said ports, a horizontal plate above the ports and movable vertically, vertical guides on the aforesaid receptacle, rods or bars sliding in said guides and connected at the upper ends to the aforesaid plate and provided with diagonal slots in their lower ends, pins passing through said slots and secured to the aforesaid gate, and plungers attached to the vertically-movable plate and entering the discharge-ports of the receptacle, substantially as set forth and shown.

4. The combination of the confection-receptacle provided with a series of discharge-ports in its bottom, a horizontal plate over the ports and movable vertically, a series of plungers attached to said plate and entering the aforesaid ports, straps depending from the aforesaid plate, a treadle connected to said straps to draw down the plate, and a counterpoise adapted to lift the plate, substantially as set forth.

5. The combination of the confection-receptacle provided with a series of discharge-ports in its bottom, a gate sliding across the bottoms of said ports, vertical guides on the receptacle, rods sliding in said guides and provided with diagonal slots in their lower ends, pins passing through said slots and secured to the gate, a horizontal plate attached to the upper ends of said rods, plungers attached to said plate and entering the aforesaid ports, straps depending from the same plate, a treadle connected to said straps, and a counterpoise connected to the plate to lift the same, substantially as described and shown.

In testimony whereof I have hereunto signed my name this 22d day of May, 1890.

MARCUS M. JUNE. [L. S.]

Witnesses:
MARK W. DEWEY,
H. M. SEAMANS.